(12) United States Patent
Desai et al.

(10) Patent No.: US 12,200,475 B2
(45) Date of Patent: *Jan. 14, 2025

(54) NETWORK ENVIRONMENT HEALTH MONITORING

(71) Applicant: Cisco Technology, Inc., San Jose, CA (US)

(72) Inventors: Vishal S. Desai, San Jose, CA (US); Benjamin J. Cizdziel, San Jose, CA (US); Santosh B. Kulkarni, Sunnyvale, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,034

(22) Filed: Oct. 4, 2023

(65) Prior Publication Data
US 2024/0031900 A1   Jan. 25, 2024

Related U.S. Application Data

(63) Continuation of application No. 17/816,853, filed on Aug. 2, 2022, now Pat. No. 11,825,372, which is a continuation of application No. 16/888,314, filed on May 29, 2020, now Pat. No. 11,445,423.

(51) Int. Cl.
*H04W 4/00* (2018.01)
*H04W 36/00* (2009.01)
*H04W 36/30* (2009.01)

(52) U.S. Cl.
CPC ... *H04W 36/0085* (2018.08); *H04W 36/0061* (2013.01); *H04W 36/302* (2023.05)

(58) Field of Classification Search
CPC ............ H04W 36/30; H04W 36/0061; H04W 36/0085; H04W 24/04; H04W 36/302; H04W 84/12; H04L 41/0661; H04L 41/5022; H04L 43/065; H04L 43/0876; H04L 43/0811; H04L 41/0631
USPC ......................................................... 370/332
See application file for complete search history.

(56) References Cited

U.S. PATENT DOCUMENTS

| | | | |
|---|---|---|---|
| 8,219,094 B2 * | 7/2012 | Huber ................. | G06Q 20/322 455/436 |
| 10,700,956 B2 * | 6/2020 | Jiang ....................... | H04L 43/50 |
| 10,820,282 B2 * | 10/2020 | Abdelmonem ...... | H04J 11/0066 |
| 11,825,372 B2 * | 11/2023 | Desai ................ | H04W 36/0085 |

(Continued)

OTHER PUBLICATIONS

Office Action for Chinese Application No. 202180032635.8, dated Sep. 28, 2023, 22 Pages.

*Primary Examiner* — Amancio Gonzalez
(74) *Attorney, Agent, or Firm* — Patterson + Sheridan, LLP (57) ABSTRACT

Network environment health monitoring is provided by receiving an alert indicating that a first station (STA) is experiencing a connection with a first Access Point (AP) below a quality threshold; identifying a set of APs connected to a shared network with the first AP within one hop of the first AP; aggregating signal metrics for the first STA from the first AP and each AP of the set of APs; identifying a cause for the connection performing below the quality threshold based on the signal metrics as aggregated; and performing a remediation strategy based on the cause as identified.

20 Claims, 6 Drawing Sheets

(56) References Cited

U.S. PATENT DOCUMENTS

| | | | | |
|---|---|---|---|---|
| 2007/0025287 A1* | 2/2007 | Goren | ............... | H04W 16/18 |
| | | | | 370/328 |
| 2007/0064660 A1* | 3/2007 | Qi | ............... | H04W 48/14 |
| | | | | 370/338 |
| 2017/0302505 A1* | 10/2017 | Zafer | ............... | H04L 41/0631 |
| 2019/0230019 A1* | 7/2019 | Jiang | ............... | H04L 43/50 |
| 2021/0385007 A1* | 12/2021 | Chang | ............... | H04L 1/0018 |
| 2022/0312249 A1* | 9/2022 | Rege | ............... | H04B 7/0695 |

* cited by examiner

NETWORK ENVIRONMENT HEALTH MONITORING

CROSS-REFERENCE TO RELATED APPLICATIONS

This application is a continuation of co-pending United States patent application Ser. No. 17/816,853 filed Aug. 2, 2022; which claims benefit to Untied States patent application Ser. No. 16/888,314 filed May 29, 2020, which issued on Sep. 13, 2022 as U.S. Pat. No. 11,445,423. The aforementioned related patent applications are herein incorporated by reference in their entirety.

TECHNICAL FIELD

Embodiments presented in this disclosure generally relate to wireless network management. More specifically, embodiments disclosed herein provide for the detection, identification, and amelioration of interference between a user equipment device located in the environment and an Access Point serving that user equipment device.

BACKGROUND

Wireless network management applications have several powerful tools to automate changes in network configurations to better serve various user equipment devices (also referred to as stations or STA) connected to an Access Point (AP) in the network. The root cause of low performance for a given STA can include an improper device setup (e.g., not enough gain on the antenna), interference at the STA from an environmental source, interference along the signal path to the AP (e.g., from an AP part of a different network), or too much traffic being received/handled at the AP. Each of these root causes for lower performance is addressed differently and the solution for one root cause can exacerbate low performance for a different root cause. Additionally, because computing resources are limited, and root cause analysis can consume valuable bandwidth, identifying and solving the particular root cause leading to poor signal quality can be difficult to determine.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 6 illustrates hardware of a computing device, according to embodiments of the present disclosure To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

OVERVIEW

One embodiment presented in this disclosure is a method including: receiving an alert indicating that a first station (STA) is experiencing a connection with a first Access Point (AP) below a quality threshold; identifying a set of APs connected to a shared network with the first AP within one hop of the first AP; aggregating signal metrics for the first STA from the first AP and each AP of the set of APs; identifying a cause for the connection performing below the quality threshold based on the signal metrics as aggregated; and performing a remediation strategy based on the cause as identified.

One embodiment presented in this disclosure is a computer readable storage device including instructions that when performed by a processor enable performance of an operation comprising: receiving an alert indicating that a first station (STA) is experiencing a connection with a first Access Point (AP) below a quality threshold; identifying a set of APs connected to a shared network with the first AP within one hop of the first AP; aggregating signal metrics for the first STA from the first AP and each AP of the set of APs; identifying a cause for the connection performing below the quality threshold based on the signal metrics as aggregated; and performing a remediation strategy based on the cause as identified.

One embodiment presented in this disclosure is a device, comprising: a processor; and a memory storage device, including instructions that when executed by the processor enable the device to: receive an alert indicating that a first station (STA) is experiencing a connection with a first Access Point (AP) below a quality threshold; identify a set of APs connected to a shared network with the first AP within one hop of the first AP that can hear a beacon transmitted from the first AP; receive a list of APs from the first STA that the first STA can hear; select a subset of APs from the set of APs by removing APs appearing on the list of APs from the set of APs; aggregate signal metrics for the first STA from the first AP and each AP of the subset of APs; identify a cause for the connection performing below the quality threshold based on the signal metrics as aggregated; and transmit a remediation strategy to the first STA based on the cause as identified.

Example Embodiments

The present disclosure provides for the detection and amelioration of poor signal performance between a station (STA) and the Access Point (AP) that the STA is associated with (i.e., the AP that maintains the wireless communications session with the given STA). The AP identifies one or more other APs in a shared network with the AP that are in range to receive signals transmitted between the AP and the STA. The AP, or a network controller, aggregates the signal metrics as observed by the other APs with metrics observed by the AP to determine the root cause of the poor connectivity between the AP and the STA (e.g., environmental effects, a rogue AP/STA, network congestion, poor antenna setup, etc.). Once the root cause is identified, the AP then performs the appropriate action to address the poor connectivity, which may include power or band adjustment for communications, rogue device containment, handing the STA off to a different AP or different radio in the AP, etc.

Figure 1:
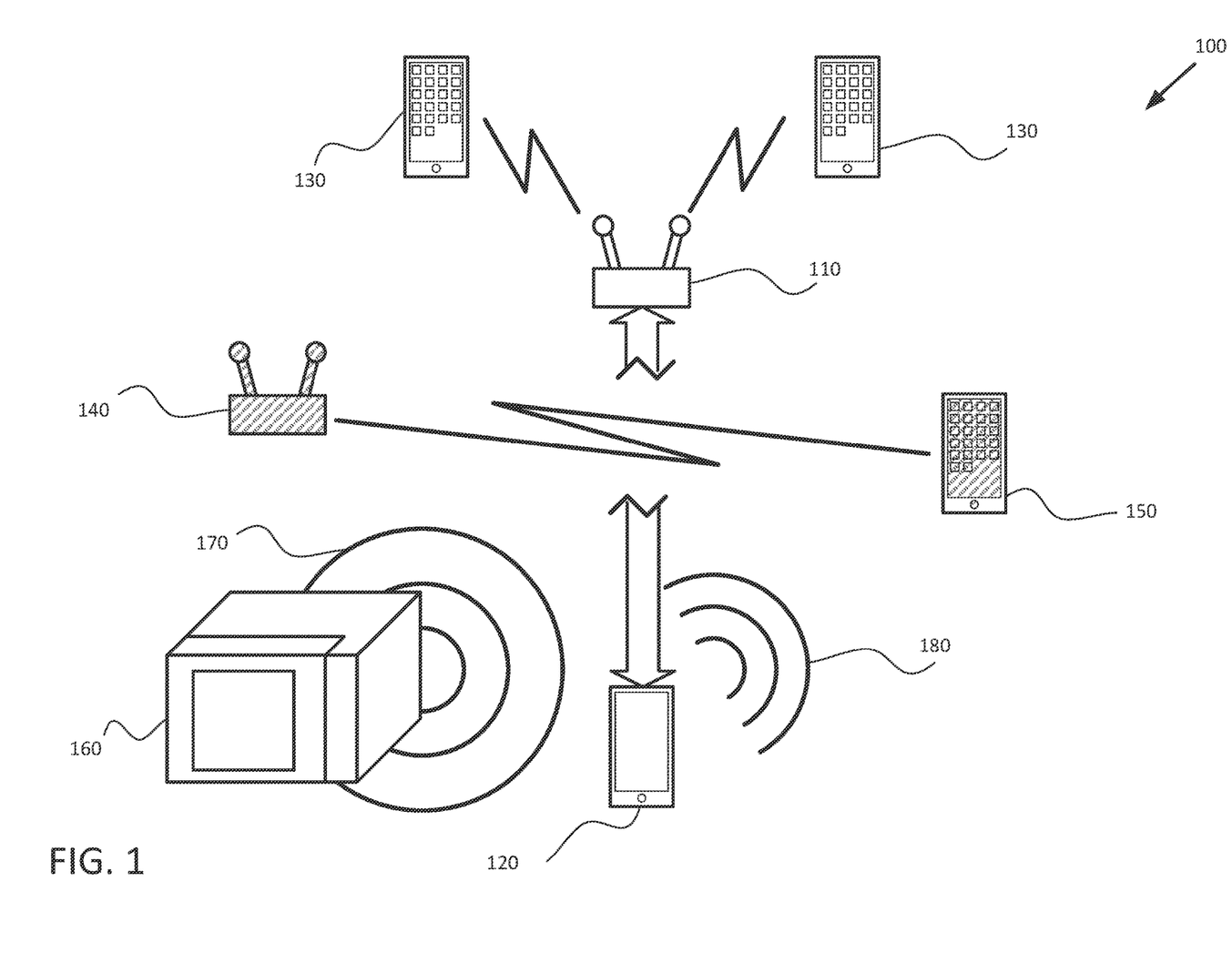
FIG. 1 illustrates a signaling environment, according to embodiments of the present disclosure.

FIG. 1 illustrates a signaling environment 100, according to embodiments of the present disclosure. In the signaling environment 100, an AP 110 maintains a connection with a STA 120 to send and receive communications between the two devices. However, other signal sources may interfere with communications between the AP 110 and the STA 120 or otherwise cause the STA 120 to receive a level of service from the AP 110 that is less than desired.

For example, the AP 110 may serve several other STAs 130 that compete for network resources with the STA 120, lowering the available bandwidth for the STA 120. The STA 120 may therefore have a strong and otherwise unimpeded signal with the AP 110, but cannot receive the desired level of service due the AP 110 allocating network resources to the other STAs 130. Increasing the power of the communications between the STA 120 and the AP 110 (e.g., reconfiguring the gain or directionality of the antennas of the AP 110 or STA 120), switching channels, or clearing the channel of interference sources would therefore have little effect on the level of service received by the STA 120. Instead, the AP 110 may hand off the STA 120 to another AP (not illustrated) in the network, limit resource consumption by the other STAs 130, instruct the STA 120 to reevaluate the desired level of service (e.g., de-prioritize the traffic for some applications to receive better service for other applications, determine whether the desired level of service can be lowered, etc.).

In another example, a rogue AP 140 and a rogue STA 150 that are part of a different network may attempt to use the same band/channel as the AP 110 and the STA 120. Because the rogue AP 140 and the rogue STA 150 are outside of the direct control of the AP 110 (or other APs or central controller in a shared network with the AP 110), and vice versa, the two networks may simultaneously use the same frequency space and channels, causing interference between the two networks. Increasing the power of the communications between the STA 120 and the AP 110 may be effective to spatially isolate and increase the signal to noise ratio (SNR) of the signals of the STA 120 or AP 110 over the signals of the rogue AP 140 and rogue STA 150, but may also escalate a response cycle in which the rogue AP 140 and rogue STA 150 increase respective signal strengths to attempt to overcome the interference of the AP 110 and the STA 120 on the rogue network. Similarly, handing the STA 120 off to a different AP in a shared network with the AP 110 may be effective to mitigate interference from the rogue network, but may also be ineffective due to the response cycle of the rogue network. Instead, the AP 110 may switch the STA 120 to another channel or clear the channel (e.g., causing the rogue AP 140 and rogue STA 150 to switch channels) to improve the quality of service for the AP 110 and the STA 120.

In another example, an environmental interference source 160 may block or reflect signals between the AP 110 and the STA 120, or may generate noise 170 that affects the signal quality between the AP 110 and the STA 120. For example, objects may reflect and/or absorb signals carried between the AP 110 and the STA 120, and various electronic devices (e.g., microwave ovens, automatic door sensors) may actively generate noise 170 on the channel used by the AP 110 and the STA 120. Such environmental interference sources 160 are often localized, but affect several channels. Accordingly, switching to a different channel or attempting to clear the channel may be ineffective, and depending on where the interference source 160 is located, handing the STA 120 off to a different AP 110 may also be ineffective or effective. Increasing the signal strength to improve the SNR of the transmitted signals may be more effective to overcome the noise 170 and/or signal attenuation of passive interference sources 160.

In another example, the AP 110 or the STA 120 may have a transceiver setup 180 that is misconfigured. For example, where the transmitter or receiver (or a filter that is part thereof) is improperly tuned to the channel, the gain is to low, the gain is too high (e.g., exacerbating interference from reflected signals in the environment, clipping data waveforms), antenna is aimed or beam-formed improperly (e.g., directing a signal away from the target and wasting power, increasing reflected signal strength), etc. To address a root cause of a misconfigured transceiver setup, the AP 110 transmits new configuration settings to the STA 120 and/or reconfigures that transceiver of the AP 110.

As will be appreciated, some or all of the example causes of low level of service (and one or multiple instances thereof) may be present in the signaling environment 100 in various embodiments.

Figure 2:
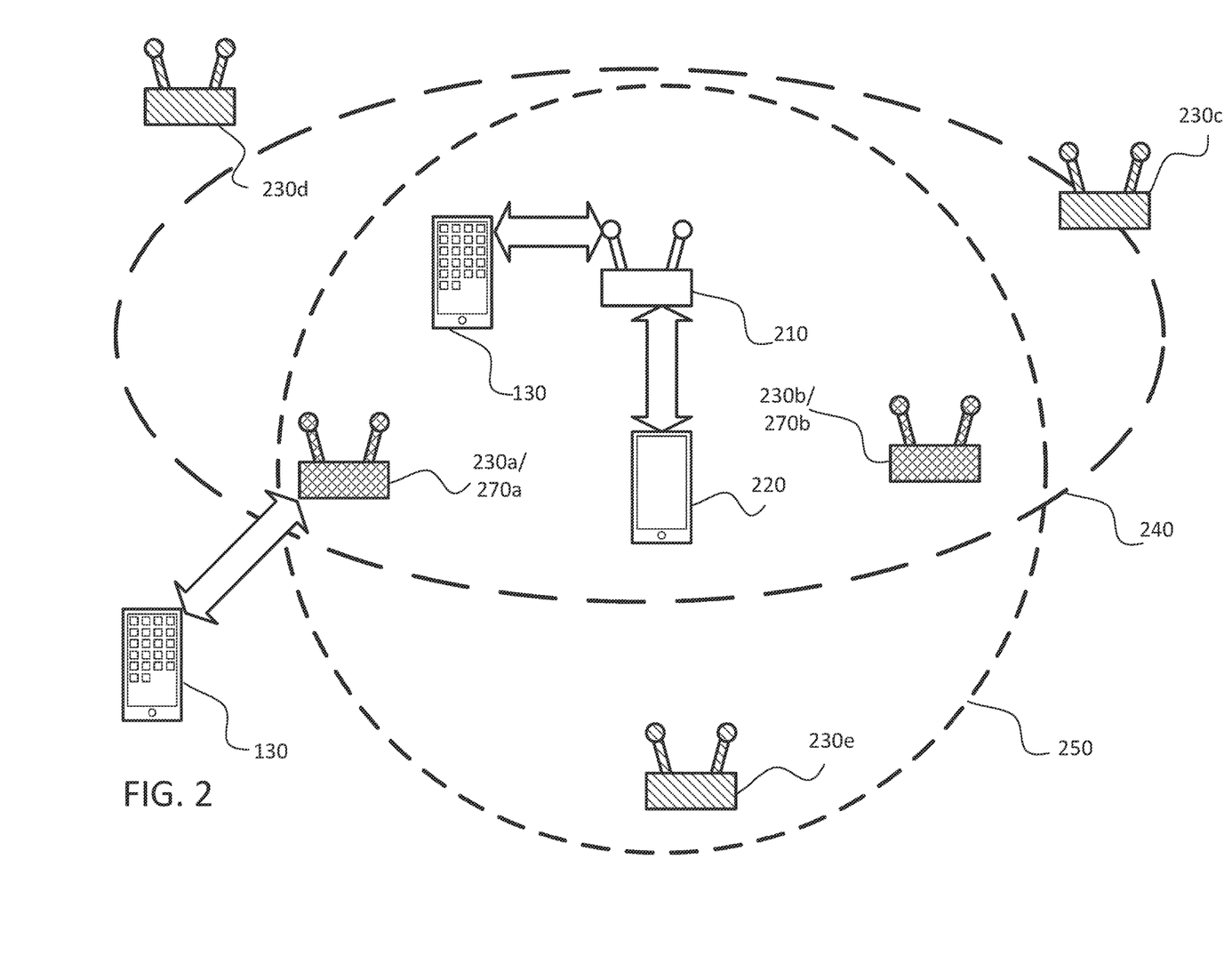
FIG. 2 illustrates a deployment scenario for a network using several APs, according to embodiments of the present disclosure.

FIG. 2 illustrates a deployment scenario 200 for a network using several APs, according to embodiments of the present disclosure. As illustrated, a connected AP (CAP) 210 and a connected STA (CSTA) 220 have an established communication session, which may be subject to any of the root causes for low level of service discussed in relation to FIG. 1. Several networked APs 230a-e (generally, NAP 230) are part of a shared network with the CAP 210, and may provide connections to other STAs 130, as may the CAP 210.

As will be appreciated, the designation of a given AP 110 as the CAP 210 or a NAP 230 and a given STA 120 as the CSTA 220 or one of the other STAs 130 is provided for clarity, but each of the CAP 210 and the NAPs 230 may correspond to the AP 110 discussed in relation to FIG. 1 and may be subject to individualized root causes for low connectivity with the several STAs connected thereto. The APs 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 6.

Similarly, each CSTA 220 and other STA 130 may correspond to the STA 120 discussed in relation to FIG. 1 and may be subject to individuated root causes for low connectivity with the associated CAP 210. The STAs 120/130 may include any computing device that is configured to wirelessly connect to one or more APs 110. Example STAs 120/130 can include, but are not limited to: smart phones, feature phones, tablet computers, laptop computers, desktop computers, Internet of Things (IoT) devices, and the like. Example hardware as may be included in a STA 120/130 is discussed in greater detail in regard to FIG. 6.

The CAP 210 may identify the NAPs 230 as part of a network list of all of the APs that are part of the shared network, a neighbor list identifying a subset of the shared network's APs that are within one hop of the CAP 210. A single hop allows for a wireless communication sent from the CAP 210 to the given NAP 230 (or vice versa) to be transmitted directly, without an intermediary device forwarding the communication. The range 240 of the CAP 210 is shown in FIG. 2 to include the first NAP 230a, the second NAP 230b, and the third NAP 230c to be within one hop; the fourth NAP 230d and the fifth NAP 230e are shown outside of the range 240 of the CAP 210 (e.g., two or more hops from the CAP 210).

The CSTA 220 may similarly track what APs are within a range 250 of the CSTA 220. For example, the APs may broadcast beacon signals that the CSTA 220 uses to determine, based on whether the beacon is interpretable or above a given power threshold or SNR threshold, whether a given AP can be heard. In an additional example, the CSTA 220 may transmit ping requests to the APs that the CSTA 220 can hear or broadcast a ping request to receive responses from the APs that can hear the CSTA 220. The range 250 of the CSTA 220 is shown in FIG. 2 to include the first NAP 230a, the second NAP 230b, and the fifth NAP 230e; the fourth NAP 230d and the third NAP 230c are shown outside of the range 250 of the CSTA 220.

To identify the root cause for poor connectivity between the CAP 210 and the CSTA 220, the CAP 210 identifies one or more NAPs 230 in the shared network that can—or should, but for the interference—hear communications between the CAP 210 and the CSTA 220. The CAP 210 may identify the set of the APs in the shared network, and winnow down the set to a subset of APs that can hear the communications between the CAP 210 and the CSTA 220 to help identify root causes for poor connectivity between the CAP 210 and the CSTA 220. For example, the CAP 210 may remove those APs that are not within one hop of the CAP 210, and thus remove any APs that cannot hear the communications sent from the CAP 210 (e.g., the fourth NAP 230d and the fifth NAP 230e are removed from the subset of APs used). The CAP 210 may further remove those APs that do not report hearing the CSTA 220 or those APs that the CSTA 220 does not report hearing (e.g., the third NAP 230c is removed from the subset of APs used). The individual APs that remain in the subset of APs are referred to herein as Sniffer APs (SAP) 270, and in FIG. 2 include a first SAP 270a corresponding to the first NAP 230a and a second SAP 270b corresponding to the second NAP 230b.

The SAPs 270 selected for inclusion in the subset of APs monitor communications between the CAP 210 and the CSTA 220 to help localize and identify a root cause for connectivity problems or low signal quality between the CAP 210 and the CSTA 220. The SAPs 270 may monitor several signal metrics (e.g., SNR, signal power, carrier frequency, etc.), but are also set up as sniffers to examine signal metrics such as bit error rate by decoding transmitted packets/data frames and comparing the payload against a checksum, parity bit, or other error-detection or error-correction mechanism in the packet/data frame. In embodiments in which communications between the CAP 210 and the CSTA 220 are encrypted, the CAP 210 shares encryption keys for those communications with the SAPs 270 so that the packets/data frames can be properly decrypted for analysis.

The CAP 210 provides the SAPs 270 with the MAC (Media Access Control) addresses of the CAP 210 and the CSTA 220 so that the SAPs 270 know which communications, when received, to monitor for various signal metrics. In some embodiments, when a SAP 270 is connected with another STA 130 using the same antenna needed to monitor communications between the CAP 210 and CSTA 220, the MAC addresses of the CAP 210 and the CSTA 220 are added to a rogue monitoring list, so that communications that include those MAC addresses, rather than being discarded on receipt, are analyzed for signaling metrics to help ascertain networking conditions for the connection between the CAP 210 and the CSTA 220. In some embodiments, in which the CAP 210 and CSTA 220 are included on a rogue monitoring list, but are communicate on a different channel that that used between the SAP 270 and the other STA 130, the SAP 270 performs off-channel scans to receive the communications sent over the channel used by the CAP 210 to serve the CSTA 220.

The CAP 210 (or a central network controller) aggregates the signal metrics measured by the subset of APs, which are associated with the individual APs that measured the signal metrics (which may include the physical locations of those APs in the environment) to identify where a source of interference is located relative to the CAP 210 and the CSTA 220 to help identify the root cause of the poor connectivity. In various embodiments, the signal metrics are sent to the CAP 210 via wireless transmission, but may also be sent via a wired transmission.

Figure 3:
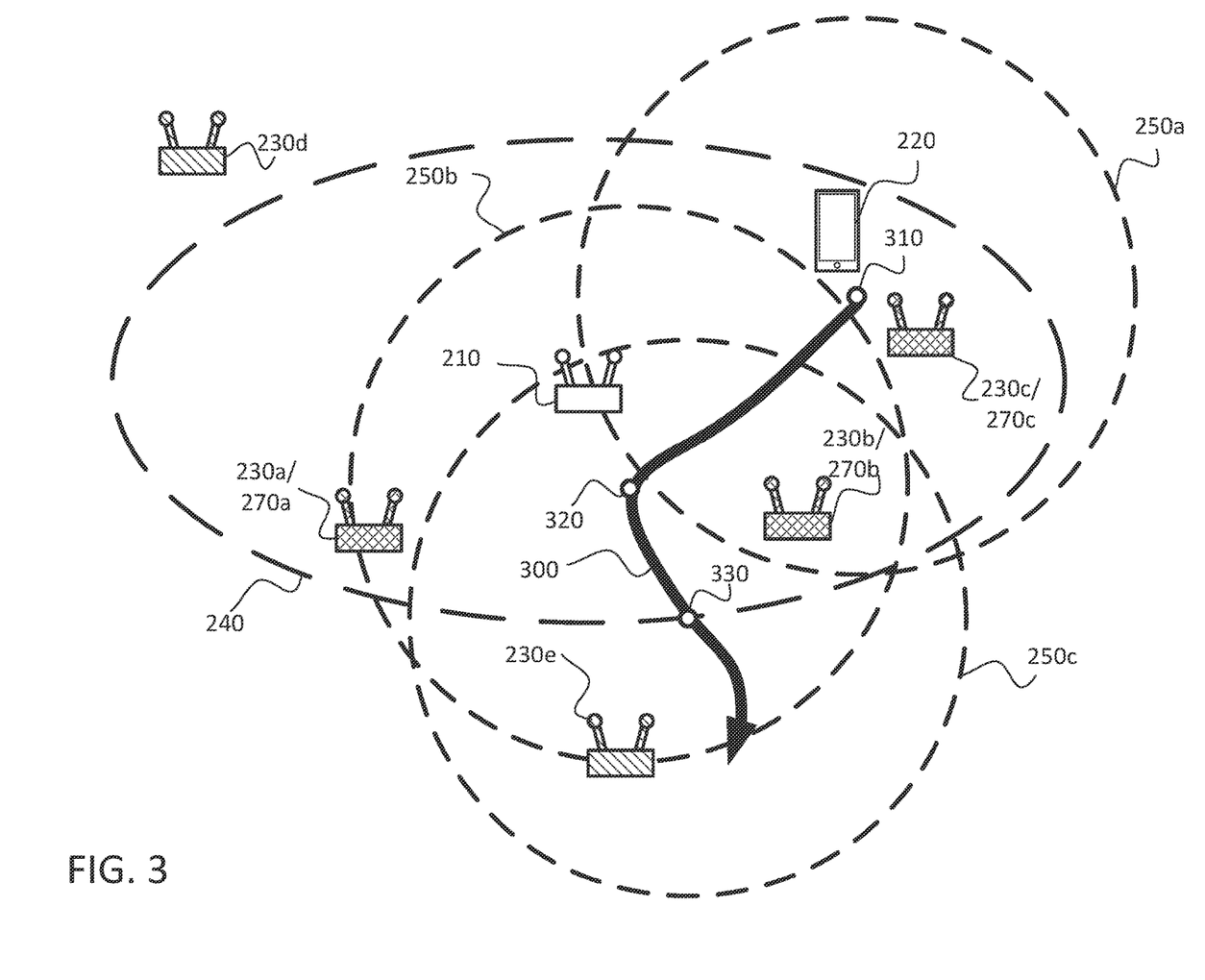
FIG. 3 illustrates a path through a wireless network deployment, according to embodiments of the present disclosure.

FIG. 3 illustrates a path 300 through a wireless network deployment, according to embodiments of the present disclosure. Because STAs may be mobile in the environment, the particular APs selected to be in the subset of APs to monitor communications between the CAP 210 and the CSTA 220 may change over time, or an individual AP may be predictively selected to be a SAP 270 despite not being currently able to hear the CSTA 220.

For example, a CSTA 220 may be observed or predicted to follow a path 300 through the environment that places the CSTA 220 within the range of different APs at different times. As illustrated, the CSTA 220 is located at a first location 310 at a first time $t_1$, a second location 320 at a second time $t_2$, and a third location 330 at a third time t3, and the corresponding ranges 250a-c of the CSTA 220 at those times include different NAPs 230. For example, the first range 250a at time $t_1$ includes the second NAP 230b and the third NAP 230, the second range 250b at time $t_2$ includes the first NAP 230a and the second NAP 230b, and the third range 250c at time $t_3$ includes the second NAP 230b and the fifth NAP 230e (which is outside of the range 240 of the CAP 210 in FIG. 3).

In some embodiments, the SAPs 270 are added and removed from the subset of APs as time progresses to include those APs that can hear both the CAP 210 and the CSTA 220 at a given time. For example, at time $t_1$ the subset may include the second NAP 230b and the third NAP 230 as the second SAP 270b and the third SAP 270c, respectively, but does not include the first NAP 230a as a first SAP 270a, as the first NAP 230a is outside of the first range 250a. Continuing the example, at time $t_2$ the subset may include the first NAP 230a and the second NAP 230b as the first SAP 270a and the second SAP 270b, respectively, but does not include the third NAP 230c as a third SAP 270c, as the third NAP 230c is outside of the second range 250b. Similarly, at time $t_3$ the subset may include only the second NAP 230b as a second SAP 270b as no other NAPs 230 are within the third range 250c and the range 240 of the CAP 210.

In some embodiments, the SAPs 270 are included in the subset of APs to proactively monitor for the communications between the CAP 210 and the CSTA 220. For example, at time $t_1$-$t_3$, the path 300 indicates that the CSTA 220 is (or is predicted to be) following a path 300 through an environment, with the first through third NAPs 230a-c within the range 240 of the CAP 210, and will therefore include the first through third NAPs 230a-c in the subset as the respective first through third SAPs 270a-c for times $t_1$-$t_3$, despite those APs not necessarily being within the range 250 of the CSTA 220 across the entire duration of time $t_1$-$t_3$.

Figure 4:
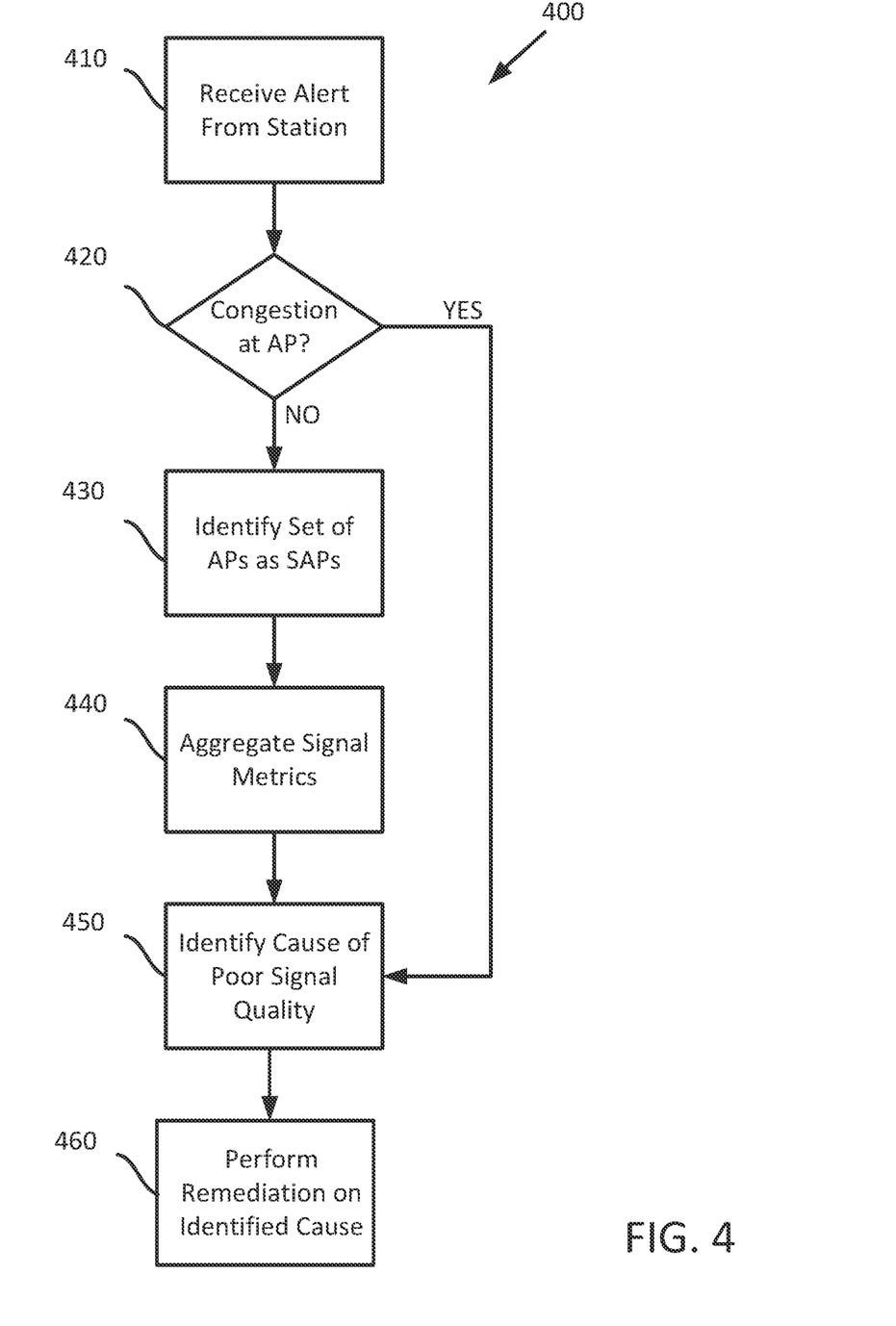
FIG. 4 is a flowchart of a method, according to embodiments of the present disclosure.

FIG. 4 is a flowchart of a method 400 for addressing poor signal quality for a STA in a wireless network, according to embodiments of the present disclosure. Although discussed from the perspective of an AP, in various embodiments, method 400 may be performed in a distributed computing environment by an external network controller computing device, a cloud-based analysis computing device, or the like on behalf of the AP.

Method 400 begins with block 410 in response to reeving an alert that a given STA connected to a given AP is to be monitored to improve the connection between the STA and AP or guard against. In some embodiments, block 410 begins method 400 in response to receiving an alert from a CSTA 220 at a CAP 210 indicating that the CSTA is experiencing a connection below a quality threshold or that the CSTA 220 has been designated as being provided a service level assurance (e.g., the device for a Very Important Person (VIP)) to stay above a quality threshold. In various embodiments, the quality threshold may indicate a retry rate for uplink and/or downlink communications or other health telemetry measures (e.g., SNR, signal strength, bit error rate, data transmission rate).

At block 420, the CAP 210 evaluates whether congestion at the CAP 210 is the root cause for the connection falling below the quality threshold. For example, a CAP 210 may serve several other STAs 130 besides the CSTA 220, communicate with various other APs, and perform various station keeping functions (e.g., broadcast network beacons, process rogue network management commands, etc.) that can reduce the speed at which the CAP 210 handles the communications needs of the CSTA 220, which contends for the computing and networking resources of the CAP 210. In various embodiments, the CAP 210 determines that congestion is the root cause when resource usage at the CAP 210 is above a use threshold (e.g., buffer usage>X %, resource unit (RU) assignment>Y %, processor usage>Z %, etc.). When the CAP 210 determines that congestion is the root cause, method 400 may proceed to block 450 without performing block 430 or block 440. When the CAP 210 determines that congestion is not the root cause, method 400 proceeds to block 430.

At block 430, the CAP 210 identifies a set of APs for use as SAPs 270 in determining the root cause for poor connectivity (i.e., what is causing the connection to be below the quality threshold). In some embodiments, the CAP 210 selects all of the NAPs 230 within range of the CSTA 220 (e.g., those NAPs 230 where probes from the CSTA 220 can be heard). In some embodiments, the CAP 210 selects all of the single hop neighbor NAPs 230 to the CAP 210 that can also hear the CSTA 220. In some embodiments, CAP 210 receives a beacon report from the CSTA 220 indicating which NAPs 230 can be heard by the CSTA 220 and filters a neighbor list maintained by the CAP 210 to select SAPs 270 that can be heard by both the CAP 210 and the CSTA 220. In some embodiments, the CAP 210 selects SAPs 270 that can both hear the CAP 210 and the CSTA 220 (e.g., by reporting that the SAP 270 can hear and decode signals including the MAC headers identifying the CSTA 220 as the source and beacons transmitted from the CAP 210) to ensure that both uplink and downlink frames can be heard by the same SAP 270. In some embodiments, SAPs 270 that have been historically identified as SAPs 270 based on the association and roaming patterns of previous STAs in the shared network are included in the set of APs regardless of whether a given NAP 230 can currently hear the CAP 210 or the CSTA 220. (e.g., for predictive inclusion as a SAP 270).

In various embodiments, when an identified SAP 270 is currently connected to another STA 130, the MAC addresses for the CAP 210 and the CSTA 220 are added to a rogue monitoring list so that the SAP 270 can continue to provide a connection with the other STA 130 while simultaneously monitoring communications between the CAP 210 and the CSTA 220 by treating those communications as pseudo-rogue communications. The SAP 270 may monitor the communications via off-channel scans (or on the same channel if the SAP 270 and other STA 130 share a channel with the CAO 210 and the CSTA 220).

In various embodiments, when communications between the CAP 210 and the CSTA 220 are encrypted, the CAP 210 shares decryption keys for the communications to the SAPs 270 that are monitoring communications between the CAP 210 and the CSTA 220.

At block 440, the SAPs 270 and CAP 210 observe and aggregate signal metrics for communications between the CAP 210 and the CSTA 220. The SAPs 270 and the CAP 210 are instructed to use embedded monitor radios to observe wireless-facing MAC issues identifiable through signal characteristics of communications between the CAP 210 and the CSTA 220. In various embodiments, the data received from the SAPs 270 and the CAP 210 related to the signal metrics for communications between the CAP 210 an the CSTA 220 are aggregated to evaluate potential root causes for poor connectivity.

At block 450, the aggregated data are analyzed to identify a potential root cause for the poor connectivity. For example, the differences between uplink and downlink RSSI (received signal strength indicator) or another signal metric at each AP are evaluated to identify asymmetrical environmental effects on signal quality. The asymmetrical differences are analyzed based on the locations of the APs in the environment to identify if the environmental effects can be localized to a region in the environment.

At block 460, depending on the identity of the root cause determined in block 450, the CAP 210, CSTA 220, or a SAP 270 addresses the cause of poor signal quality by performing a remediation strategy based on the identified cause. Method 400 may then conclude.

Figure 5:
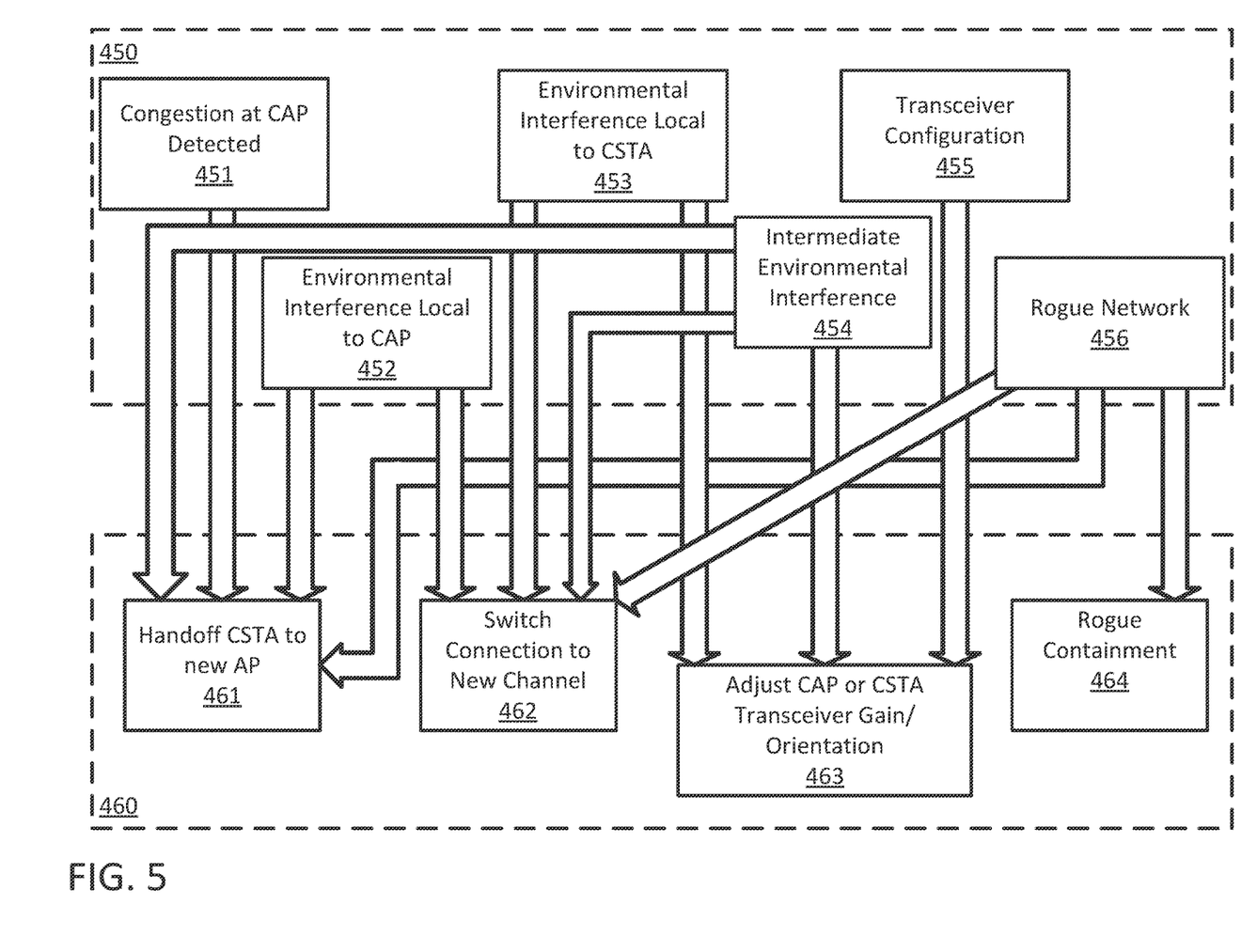
FIG. 5 illustrates a detailed view of portions of the method discussed in relation to FIG. 4, according to embodiments of the present disclosure.

FIG. 5 illustrates a detailed view 500 of block 450 and block 460 of method 400, discussed in relation to FIG. 4, according to embodiments of the present disclosure. Depending on the root cause identified per block 450, different remediation strategies are taken to address the cause of poor signal quality per block 460.

In some embodiments, when the cause is determined in sub-block 451 to be congestion detected at the CAP 210, block 450 proceeds to sub-block 461. For example, when computing or network usage at the CAP 210 is determined to be above a use threshold that prevents the CSTA 220 from winning contention for desired resources, block 450 may resolve to sub-block 451.

At sub-block 461, the CAP 210 or a SAP 270 performs a remediation strategy that instructs the CSTA 220 to handoff to a new AP that is experiencing less congestion than the CAP 210. In some embodiments, the AP steering the CSTA 220 to a new AP cross-validates with the new AP and the beacon report from the CSTA 220 that the new AP in within the range 240 of the CSTA 220 and is capable of providing a higher quality of service than the CAP 210 or another candidate new AP.

In some embodiments, when the cause is determined in sub-block 452 to be environmental inference local to the CAP 210, block 450 proceeds to sub-block 461 and/or sub-block 462 to perform one or more remediation strategies as outlined therein. For example, when some or all of the SAPs 270 report high-quality signals from the CSTA 220, but low quality signals from the CAP 210, block 450 may resolve to sub-block 452. In another example, when the CAP 210 identifies poor signal quality received from several different CSTA 220 located at different locations, block 450 may resolve to sub-block 452.

At sub-block 462, the CAP 210 or a SAP 270 performs a remediation strategy that instructs the CSTA 220 to handoff to a new AP that is experiencing less congestion than the CAP 210. In some embodiments, the AP steering the CSTA 220 to a new AP cross-validates with the new AP and the beacon report from the CSTA 220 that the new AP in within the range 240 of the CSTA 220 and is capable of providing a higher quality of service than the CAP 210 or another candidate new AP.

In some embodiments, when the cause is determined in sub-block 453 to be environmental inference local to the CSTA 220, block 450 proceeds to sub-block 462 and/or sub-block 463 to perform one or more remediation strategies as outlined therein. For example, when some or all of the SAPs 270 report low-quality signals from the CSTA 220, but low quality signals from the CAP 210, block 450 may resolve to sub-block 453. In another example, when the CAP 210 identifies poor signal quality received from several different CSTA 220 located at different locations, block 450 may resolve to sub-block 453.

At sub-block 463, the CAP 210 or a SAP 270 instructs the CAP 210 or CSTA 220 to adjust a transceiver configuration, including a gain and/or an orientation/directionality of an antenna. In some embodiments, the gain is increased to provide a stronger signal strength to overcome environmental interference, or is decreased to reduce the effects of signal reflections. In some embodiments, the directionality of the antenna is adjusted to reduce the occurrence or severity of reflected signals or track the signal for a more direct line of travel for communications between the CAP 210 and the CSTA 220.

In some embodiments, when the cause is determined in sub-block 454 to be environmental inference intermediate to the CAP 210 and CSTA 220 along the signal path between the CAP 210 and the CSTA 220, block 450 proceeds to sub-block 461, sub-block 462, and/or sub-block 463 to perform one or more remediation strategies as outlined therein. For example, when SAPs 270 intermediate to the CSTA 220 and CAP 210 report low-quality signals from both the CAP 210 and the CSTA 220, and the CAP 210 reports low-quality uplink signals from the CSTA 220, block 450 may resolve to sub-block 454.

In some embodiments, when the cause is determined in sub-block 455 to be related to transceiver configuration, block 450 proceeds to sub-block 463. For example, when SAPs 270 report an expected signal degradation between the CAP 210 and the CSTA 220 (e.g., no unexpected interference source) or an excess of signal reflections between the CAP 210 and the CSTA 220, block 450 may resolve to sub-block 455

In some embodiments, when the cause is determined in sub-block 456 to be related to a rogue network (a rogue AP 140 and/or rogue STA 150), block 450 proceeds to sub-block 461, sub-block 462, and/or sub-block 46 to perform one or more remediation strategies as outlined therein. For example, when some of the APs detect signals with MAC addresses that are not addressed to or from a NAP 230, block 450 resolves to sub-block 456.

At sub-block 463, the CAP 210 or a SAP 270 performs rogue containment procedures. Rogue containment procedures can include various methods to clear the channel used by the CAP 210 and the CSTA 220 from communications between a rogue AP 140 and the rogue STA 150. In some embodiments, rogue containment includes sending a de-authentication message to the rogue STA 150 to disconnect the rogue AP 140 and the rogue STA 150 or cause the rogue network to shift the rogue STA 150 and rogue AP 140 to a different channel. In some embodiments, a NAP 230 attempts to connect to the rogue AP 140 as a client (impersonating a STA), and uses the channel enough to maintain the connection with the rogue AP 140 and reserves the rest of the time in the channel for use by the CAP 210 and the CSTA 220 to communicate with one another without an unknown rogue STA 150 contending for the same channel at the same time.

Figure 6:
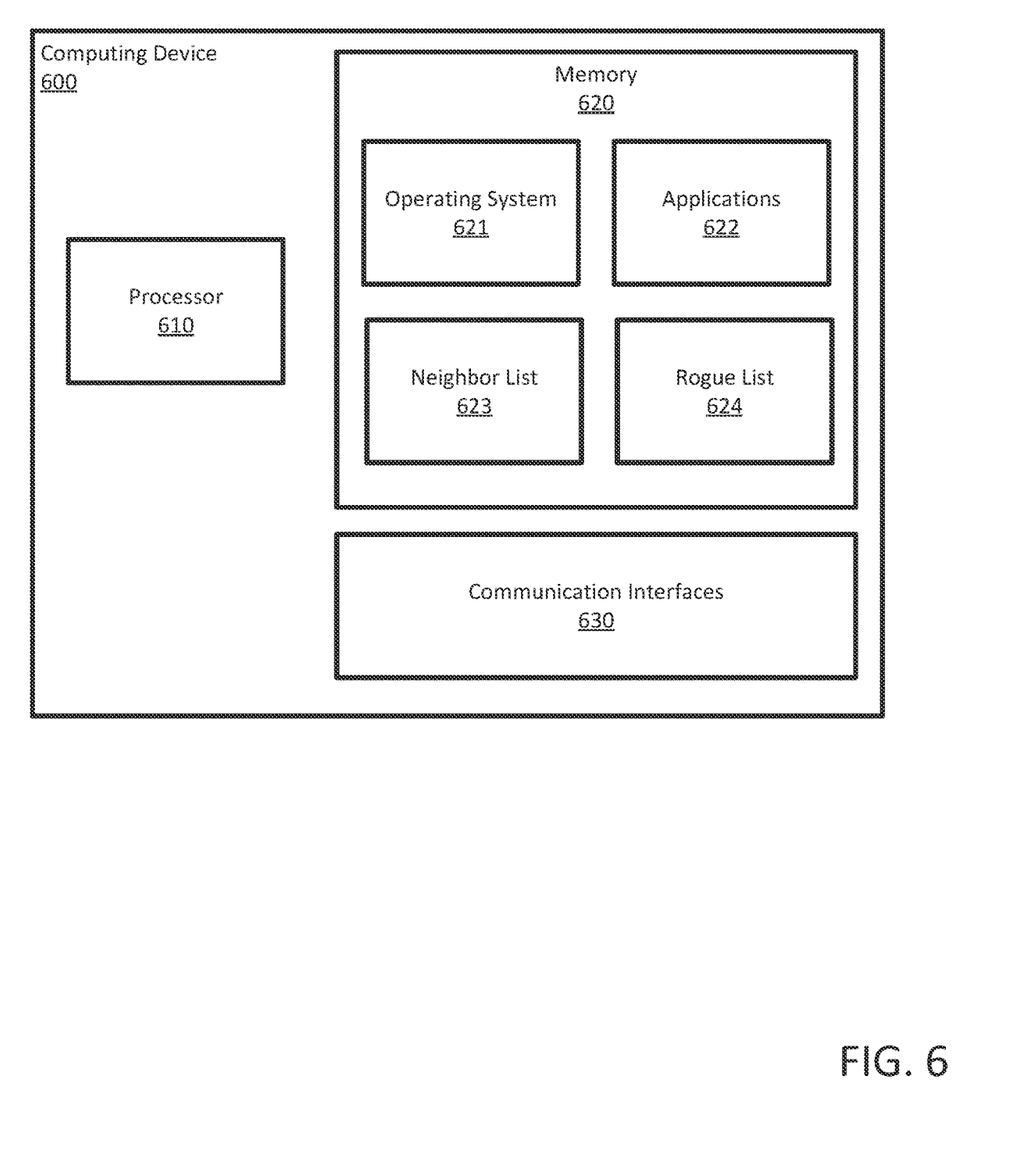

FIG. 6 illustrates hardware of a computing device 600, as may be used in an AP 110 or a STA 120 described in the present disclosure. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communications interfaces 630 are representative of wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure. Additionally, the memory 620 includes one or more of a neighbor list 623 or a rogue list 624 indicating what APs can (or are expected to) be detected by the computing device 600.

The neighbor list 623 can identify APs that are part of shared network, where those APs are located in the physical environment, capabilities of those APs, and how many hops a communication travels to reach the given AP in the network from the computing device 600. In various embodiments, the neighbor list 623 is populated with the identities of APs that can be "heard" from the computing device 600 and may be periodically updated as environmental and networking conditions change. In some embodiments, an AP is determined to be heard when a beacon broadcast from that AP is received by the computing device 600 with at least a threshold signal quality (e.g., SNR, signal strength, error rate, etc.). In some embodiments, the neighbor list may remove APs that cannot hear the computing device 600, so that the neighbor list 623 includes those APs that can be in bi-directional communication with the computing device 600.

The rogue list 624 identifies APs or STAs that are not under the control of or in a shared network with the computing device 600, but may also identify APs or STAs in the shared network that are designated as pseudo-rogues that report suffering from poor connectivity that the computing device 600 is to monitor. The rogue list 624 can be used to passively monitor devices using the same channel(s) for wireless communication as the computing device 600, to avoid selecting channels used by rogue devices, or to actively attempt to clear those channels of communications from the rogue devices. The rogue list 624 may be periodically updated as new rogue devices are detected or leave the wireless signaling range of the computing device 600. In some embodiments, devices in the shared network may share the identifies and signaling metrics of the rogue devices to allow the network as a whole to configure the APs and STAs in the shared network to avoid interference from rogue devices detected at a portion of the shared network. For example, a first AP that is susceptible to interference from a rogue AP and a second AP neighboring the first AP that is not affected by transmissions from the rogue AP (e.g., due to distance) may configure the second AP to use the channels used by the rogue AP, thus freeing the first AP to select different channels.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    in response to receiving a connection alert for a network connection, identifying, at an analysis device in a network, a set of devices connected to a shared network with an access point (AP) associated with the network connection;
    aggregating signal metrics for a first station (STA) from the AP and each device of the set of devices to determine a cause for the network connection performing below a quality threshold; and
    performing a remediation strategy based on the cause as identified.

2. The method of claim 1, wherein identifying the set of devices further comprises:
    receiving a list of devices from the first STA that the first STA can hear; and
    removing devices from the set of devices that are absent from the list of devices.

3. The method of claim 1, wherein identifying the set of devices further comprises:
    removing devices from the set of devices that cannot hear a beacon from the AP; and
    removing devices from the set of devices that cannot decode a MAC header in messages sent from the first STA to the AP.

4. The method of claim 1, wherein identifying the set of devices further comprises:
    adding and removing devices to the set of devices over a period of time based on a predicted path of the first STA in a physical environment and physical locations of the devices in the physical environment.

5. The method of claim 1, further comprising:
    receiving a second alert from a second STA indicating that the second STA is experiencing a second network connection with the AP below a quality threshold; and
    in response to determining that the AP is experiencing one of network congestion or interference local to the AP, the remediation strategy includes, before identifying the set of devices, signaling the second STA to handoff to a second AP.

6. The method of claim 1, in response to determining that the cause is due to a rogue AP that is not part of the shared network, the remediation strategy includes:
    sending a de-authentication packet to a rogue device connected to the rogue AP.

7. The method of claim 1, wherein the connection carries encrypted communications between the first STA and the AP, further comprising:
    sharing decryption keys from the AP to the set of devices, and
    wherein the signal metrics are based on decrypted communications between the first STA and the AP as received at individual devices of the set of devices.

8. The method of claim 1, wherein a given device of the set of devices is serving a STA device:
    adding a MAC addresses of the first STA and the AP to a rogue monitoring list on the given device;
    receiving communications transmitted between the first STA and the AP at the given device that include data frames; and
    in response to the MAC addresses in the communications matching the MAC addresses of the first STA and the AP, analyzing the data frames to ascertain networking conditions for the connection between the first STA and the AP.

9. The method of claim 8, wherein a given channel used by the given device to serve the STA device is not a first channel used by the AP to serve the first STA, the method further comprises:
    performing off-channel scans to receive the communications sent over the first channel used by the AP to serve the first STA.

10. A non-transitory computer readable storage device including instructions that when performed by a processor enable performance of an operation comprising:
    in response to receiving a connection alert for a network connection, identifying, at an analysis device in a network, a set of devices connected to a shared network with an access point (AP) associated with the network connection;
    aggregating signal metrics for a first station (STA) from the AP and each device of the set of devices to determine a cause for the network connection performing below a quality threshold; and
    performing a remediation strategy based on the cause as identified.

11. The computer readable storage device of claim 10, wherein identifying the set of devices further comprises:
    receiving a list of devices from the first STA that the first STA can hear; and
    removing devices from the set of devices that are absent from the list of devices.

12. The computer readable storage device of claim 10, wherein identifying the set of devices further comprises:
    removing devices from the set of devices that cannot hear a beacon from the AP; and
    removing devices from the set of devices that cannot decode a MAC header in messages sent from the first STA to the AP.

13. The computer readable storage device of claim 10, wherein identifying the set of devices further comprises:
    adding and removing devices to the set of devices over a period of time based on a predicted path of the first STA in a physical environment and physical locations of the devices in the physical environment.

14. The computer readable storage device of claim 10, wherein the operation further comprises:
    receiving a second alert from a second STA indicating that the second STA is experiencing a second network connection with the AP below a quality threshold; and
    in response to determining that the AP is experiencing one of network congestion or interference local to the AP, the remediation strategy includes, before identifying the set of devices, signaling the second STA to handoff to a second AP.

15. The computer readable storage device of claim 10, wherein the remediation strategy includes, in response to determining that the cause is due to a rogue AP that is not part of the shared network, sending a de-authentication packet to a rogue device connected to the rogue AP.

16. The computer readable storage device of claim 10, wherein the connection carries encrypted communications between the first STA and the AP, the operation further comprising:

sharing decryption keys from the AP to the set of devices, and wherein the signal metrics are based on decrypted communications between the first STA and the AP as received at individual devices of the set of devices.

17. The computer readable storage device of claim 10, wherein a given device of the set of devices is serving a STA device, the operation further comprising:

adding a MAC addresses of the first STA and the AP to a rogue monitoring list on the given device;

receiving communications transmitted between the first STA and the AP at the given device that include data frames; and in response to the MAC addresses in the communications matching the MAC addresses of the first STA and the AP, analyzing the data frames to ascertain networking conditions for the connection between the first STA and the AP.

18. The computer readable storage device of claim 17, wherein a given channel used by the given device to serve the STA device is not a first channel used by the AP to serve the first STA, the operation further comprises:

performing off-channel scans to receive the communications sent over the first channel used by the AP to serve the first STA.

19. A device, comprising:

a processor; and a memory storage device, including instructions that when executed by the processor enable the device to:

in response to receiving a connection alert for a network connection, identifying, at an analysis device in a network, a set of devices connected to a shared network with an access point (AP) associated with the network connection;

receive a list of devices from a first STA that the first STA can hear;

select a subset of devices from the set of devices by removing devices appearing on the list of devices from the set of devices;

aggregate signal metrics for the first STA from the AP and each device of the subset of devices;

identify a cause for the network connection performing below a quality threshold based on the aggregated signal metrics; and transmit a remediation strategy to the first STA based on the cause as identified.

20. The device of claim 19, wherein the instructions further enable the device to:

receive a MAC addresses of a STA device connected to a second AP;

add the STA device and the second AP to a rogue monitoring list;

receive communications transmitted between the STA device and the second AP that include data frames; and in response to the MAC addresses in the communications matching the MAC addresses of the STA device and the second AP, analyze the data frames to ascertain networking conditions for the connection between the STA device and the second AP.

\* \* \* \* \*